United States Patent
Shirakawa et al.

(10) Patent No.: US 10,215,345 B2
(45) Date of Patent: Feb. 26, 2019

(54) BATTERY HOLDER AND PORTABLE LIGHTING APPARATUS USING SAME

(71) Applicant: Panasonic Intellectual Property Management Co., Ltd., Osaka (JP)

(72) Inventors: Miho Shirakawa, Osaka (JP); Katsumasa Kawabata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 293 days.

(21) Appl. No.: 15/122,148

(22) PCT Filed: Feb. 4, 2015

(86) PCT No.: PCT/JP2015/000484
§ 371 (c)(1),
(2) Date: Aug. 26, 2016

(87) PCT Pub. No.: WO2015/133060
PCT Pub. Date: Sep. 11, 2015

(65) Prior Publication Data
US 2016/0377241 A1 Dec. 29, 2016

(30) Foreign Application Priority Data
Mar. 7, 2014 (JP) ................... 2014-045310

(51) Int. Cl.
*F21L 4/00* (2006.01)
*F21V 23/00* (2015.01)
(Continued)

(52) U.S. Cl.
CPC ............... *F21L 4/00* (2013.01); *F21V 23/00* (2013.01); *F21V 23/0414* (2013.01); *H01M 2/1044* (2013.01); *H01M 2220/30* (2013.01)

(58) Field of Classification Search
CPC ................... F21L 4/00; H01M 2/1044
See application file for complete search history.

(56) References Cited

U.S. PATENT DOCUMENTS 5,843,595 A 12/1998 Kawakatsu
7,727,007 B2 * 6/2010 Sun ............... H01M 2/1044
439/500
(Continued)

FOREIGN PATENT DOCUMENTS

JP 58-179755 U 12/1983
JP 6-163016 6/1994
(Continued)

OTHER PUBLICATIONS

International Search Report of PCT application No. PCT/JP2015/000484 dated Apr. 7, 2015.

*Primary Examiner* — Robert J May
(74) *Attorney, Agent, or Firm* — McDermott Will & Emery LLP

(57) ABSTRACT

A battery holder includes storage chamber for storing a battery. The storage chamber includes: opening end surface through which battery can be taken in or out; and upper surface section, lower surface section, and first and second side-surface sections (opposing each other) for holding the battery. Projection is formed on the inner wall of first side-surface section at a portion including the end on the opening end surface side. Outward deformable flexible section is formed on second side-surface section at a portion including the end on the opening end surface side. Slit that extends from third side-surface section opposite to the opening end surface toward the opening end surface and stops at the position corresponding to a part of the battery is formed in upper surface section and/or lower surface sec-
(Continued)

tion. The end of the flexible section is located closer to the third side-surface section than the projection.

5 Claims, 8 Drawing Sheets

(51) Int. Cl.
*F21V 23/04* (2006.01)
*H01M 2/10* (2006.01)

(56) References Cited

U.S. PATENT DOCUMENTS

2001/0002346 A1  5/2001  Kodaira
2014/0286001 A1  9/2014  Kawabata et al.

FOREIGN PATENT DOCUMENTS

| | | |
|---|---|---|
| JP | 9-045302 | 2/1997 |
| JP | 10-284030 | 10/1998 |
| JP | 2000-030680 | 1/2000 |
| JP | 2000-164188 | 6/2000 |
| JP | 2001-155704 | 6/2001 |
| JP | 2014-013701 | 1/2014 |

* cited by examiner

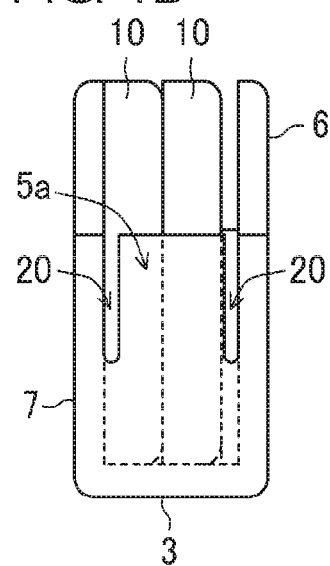
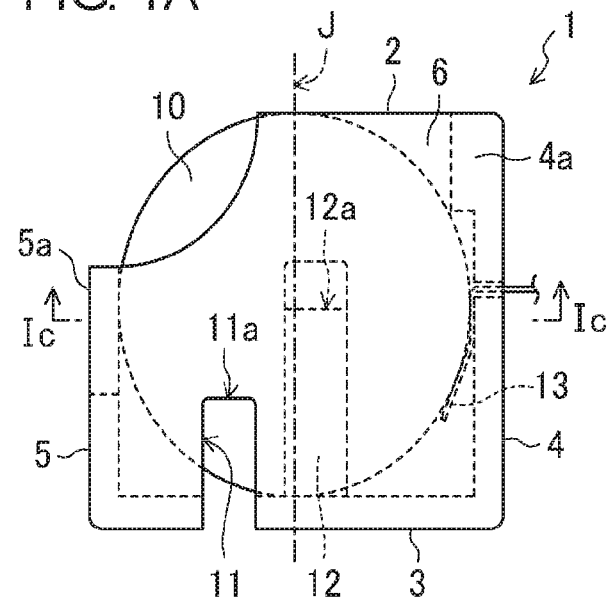
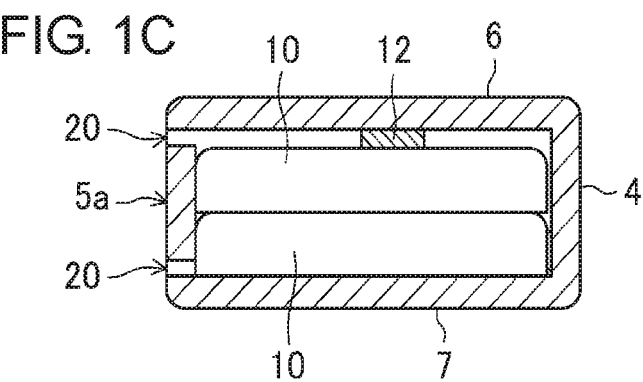
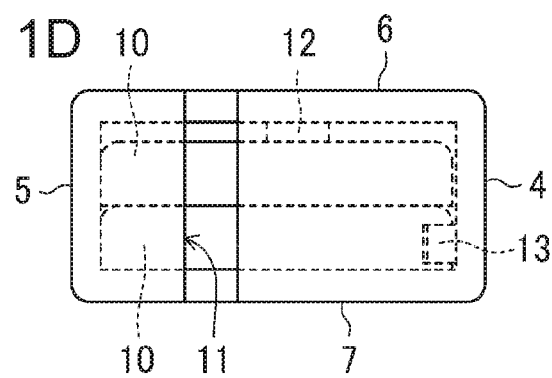

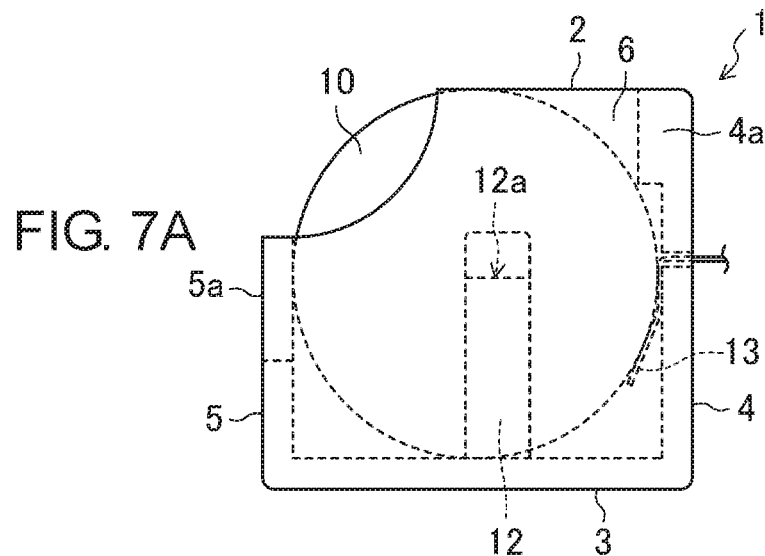
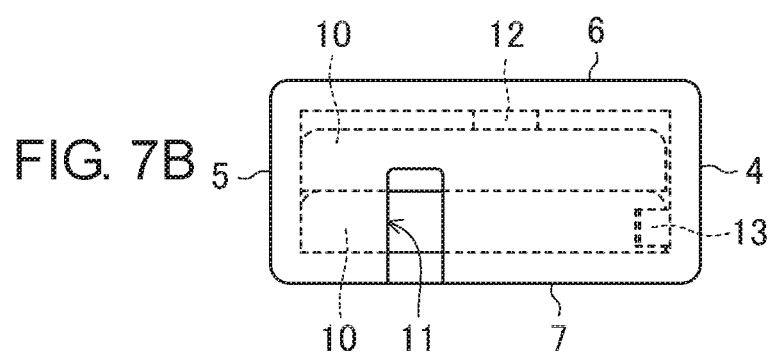
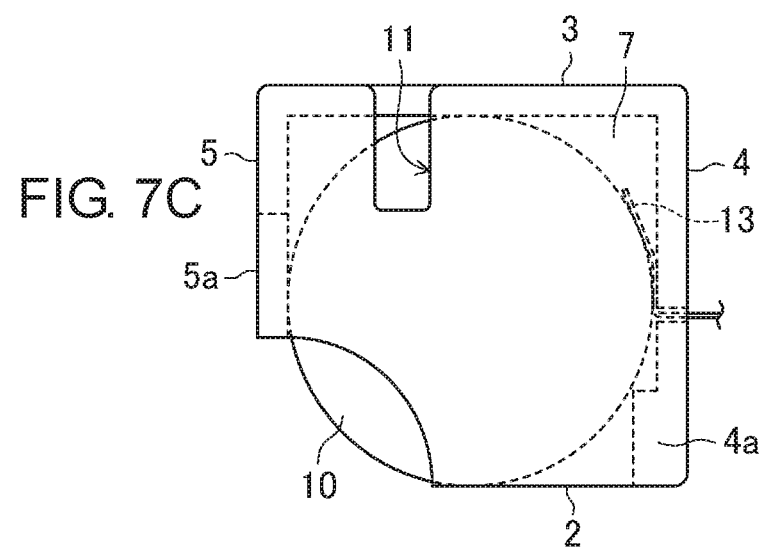

BATTERY HOLDER AND PORTABLE LIGHTING APPARATUS USING SAME

CROSS-REFERENCE TO RELATED APPLICATIONS

This application is a U.S. national stage application of the PCT International Application No. PCT/JP2015/000484 filed on Feb. 4, 2015, which claims the benefit of foreign priority of Japanese patent application 2014-045310 filed on Mar. 7, 2014, the contents all of which are incorporated herein by reference.

TECHNICAL FIELD

The present invention relates to a battery holder including a storage chamber for storing a button battery.

BACKGROUND ART

An electronic apparatus including a button battery as its power source is sometimes used in a state where a battery holder that holds the button battery is detachably mounted on the electronic apparatus (for example, Patent Literatures 1 and 2). The button battery is mounted on the electronic apparatus in a state where the button battery is held in the battery holder, so that the button battery does not drop out of the electronic apparatus during the mounting. However, if the battery holder drops when the battery holder is attached or detached from the electronic apparatus, the button battery can come off the battery holder on the impact and can become lost.

Patent Literature 3 discloses a battery holder having a pair of slits in its side wall. The side wall serves as a flexible portion, and a projection for holding a battery is formed on the inner surface of the flexible portion. The battery is stored into a storage chamber of the battery holder while expanding the flexible portion outward. The battery stored in the storage chamber is held by the projection formed on the inner surface of the flexible portion. Thus, the battery is prevented from dropping off.

Patent Literature 4 discloses a battery holder having a latch on the inside of its side wall. The latch elastically shifts outward or inward together with the side wall, and a locking claw for holding a battery is formed at the upper end of the latch. The battery is stored into a storage chamber of the battery holder while expanding the upper end of the latch outward. The battery stored in the storage chamber is held by the latch and the locking claw that is formed at the upper end of the latch. Thus, the battery is prevented from dropping off.

CITATION LIST

Patent Literature

PTL 1: Unexamined Japanese Patent Publication No. H6-163016
PTL 2: Unexamined Japanese Patent Publication No. H9-45302
PTL 3: Unexamined Japanese Utility Model Publication No. S58-179755
PTL 4: Unexamined Japanese Patent Publication No. 2000-164188

SUMMARY OF THE INVENTION

The battery holders disclosed in Patent Literatures 3 and 4 certainly have a simple configuration, and can prevent a battery stored in a storage chamber from accidentally dropping to the outside. When a battery is stored into the storage chamber, by pushing the flexible portion or latch with the battery, a flexible portion or latch can be easily expanded outward. In order to take the battery out of the storage chamber, however, the flexible portion or latch must be expanded outward by hand. Therefore, it is difficult to smoothly take the battery out of the storage chamber. Furthermore, when the flexible portion or latch is expanded outward, the holding of the battery by a projection or locking claw is immediately eliminated, and hence the battery can drop from the battery holder to become lost.

The present invention addresses such problems. The main objective of the present invention is to provide a battery holder that has a simple configuration, prevents a battery stored in the storage chamber from accidentally dropping to the outside, and allows the battery to be smoothly taken out of the storage chamber.

A battery holder of the present invention includes a storage chamber for storing a button battery. The storage chamber includes: an opening end surface through which the button battery can be taken in or out while being led by its side surface; and an upper surface section, a lower surface section, and a first side-surface section and second side-surface section (opposing each other) for holding the flat surfaces and the side surface of the button battery. A projection projecting toward the inside of the storage chamber is formed on an inner wall of the first side-surface section at a portion including the end on the opening end surface side. A flexible section that is deformable toward the outside of the storage chamber is formed on the second side-surface section at a portion including the end on the opening end surface side. A slit is formed in the upper surface section and/or the lower surface section. The slit extends from a third side-surface section opposite to the opening end surface toward the opening end surface, and stops at the position corresponding to a part of the button battery. The end of the flexible section on the opening end surface side is located closer to the third side-surface section than the projection is. The slit is located closer to the second side-surface section than the center line is. Here, the center line passes the center of the button battery, and is parallel with the first and second side-surface sections.

The present invention can provide a battery holder that has a simple configuration, prevents a battery stored in a storage chamber from accidentally dropping to the outside, and allows the battery to be smoothly taken out of the storage chamber.

BRIEF DESCRIPTION OF DRAWINGS

FIGS. 1A to 1D show diagrams schematically showing the configuration of a battery holder in accordance with an exemplary embodiment of the present invention. FIG. 1A is a top view, FIG. 1B is a side view from a second side-surface section side of a storage chamber, FIG. 1C is a sectional view taken along line Ic-Ic of FIG. 1A, and FIG. 1D is a side view from a third side-surface section side of the storage chamber.

FIG. 5A is a top view in storing the battery into the storage chamber, and FIG. 5B is a top view in taking the battery out of the storage chamber.

FIGS. 7A to 7B show diagrams schematically showing the configuration of a battery holder in accordance with a modified example of the present exemplary embodiment. FIG. 7A is a top view, FIG. 7B is a side view from a third side-surface section side, and FIG. 7C is a bottom view.

DESCRIPTION OF EMBODIMENT(S)

Figure 2:
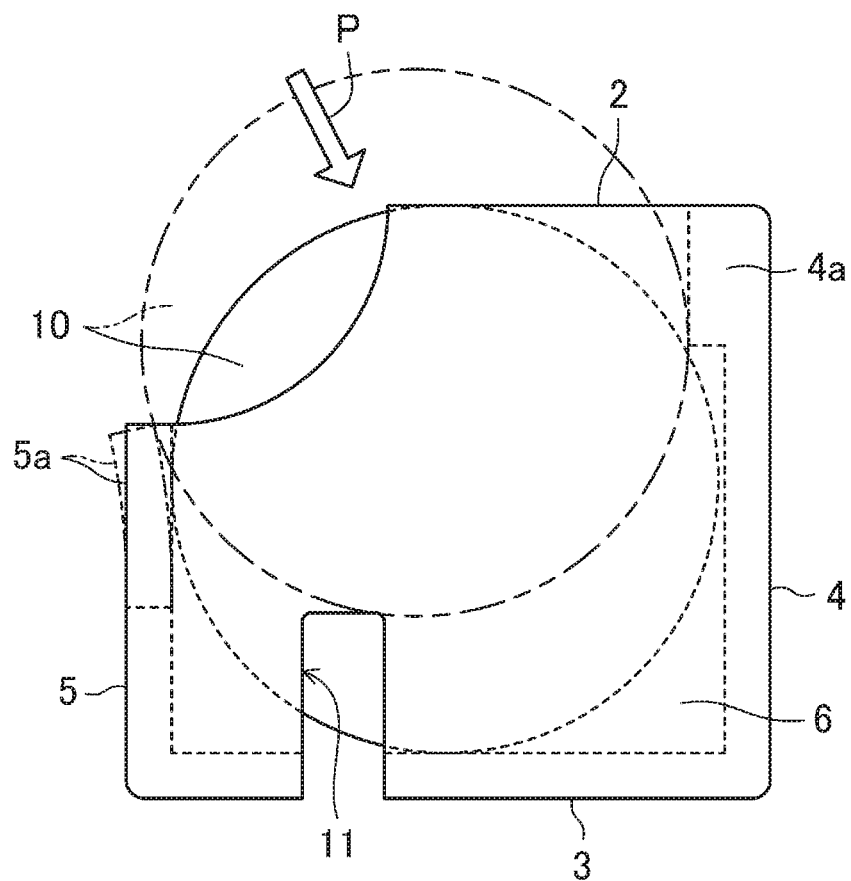
FIG. 2 is a top view showing an operation of storing a battery into the storage chamber in accordance with the exemplary embodiment of the present invention.

Hereinafter, an exemplary embodiment of the present invention is described with reference to the accompanying drawings. The present invention is not limited to the following exemplary embodiment. The exemplary embodiment can be appropriately modified in a range that does not depart from the scope bringing the advantage of the present invention.

FIG. 1 shows diagrams schematically showing the configuration of a battery holder in accordance with the exemplary embodiment of the present invention. FIG. 1A is a top view, FIG. 1B is a side view from the second side-surface section 5 side of storage chamber 1, FIG. 1C is a sectional view taken along line Ic-Ic of FIG. 1A, and FIG. 1D is a side view from the third side-surface section 3 side of storage chamber 1.

The battery holder of the present exemplary embodiment includes storage chamber 1 for storing a button battery. The button battery collectively means a battery having a button shape (thin cylindrical shape), and does not depend on the battery type. For example, the button battery may be a primary battery or may be a secondary battery. The button battery includes a battery called a coin type battery. Hereinafter, the button battery is simply referred to as "battery".

As shown in FIG. 1A to FIG. 1D, storage chamber 1 includes: opening end surface 2 through which battery 10 can be taken in or out while being led by the side surface of battery 10; and upper surface section 6, lower surface section 7, and first side-surface section 4 and second side-surface section 5 (opposing each other) for holding the flat surfaces and the side surface of battery 10. Storage chamber 1 has a space in which two batteries 10 can be stacked and stored.

As shown in FIG. 1A, projection 4a projecting toward the inside of storage chamber 1 is formed on the inner wall of first side-surface section 4 at a portion including the end on the opening end surface 2 side. As shown in FIG. 1A to FIG. 1C, flexible section 5a that is deformable toward the outside of storage chamber 1 is formed on second side-surface section 5 at a portion including the end on the opening end surface 2 side. Flexible section 5a is configured so that a pair of cutouts 20 that extend from the end on the opening end surface 2 side toward third side-surface section 3 opposite to opening end surface 2 are formed in second side-surface section 5.

As shown in FIG. 1A and FIG. 1D, slit 11 that extends from third side-surface section 3 toward opening end surface 2 to the position corresponding to a part of battery 10 is formed in upper surface section 6 and lower surface section 7 of storage chamber 1. Therefore, when storage chamber 1 is viewed from the upper surface section 6 side and the lower surface section 7 side in the state where battery 10 is stored in storage chamber 1, the upper surface and lower surface of battery 10 are partially exposed from slit 11.

Elastic piece 12 for pressing the upper surface of battery 10 is attached on upper surface section 6 of storage chamber 1, and elastic piece 13 for pressing the side surface of battery 10 is attached on first side-surface section 4. As shown in FIG. 1A, in a state where battery 10 is stored in storage chamber 1, battery 10 is held in storage chamber 1 by projection 4a disposed on first side-surface section 4 and elastic pieces 12 and 13. Therefore, battery 10 once stored in storage chamber 1 through opening end surface 2 does not accidentally drop out of opening end surface 2. When the upper surface (or lower surface) and the side surface of battery 10 serve as a positive electrode terminal and a negative electrode terminal, elastic pieces 12 and 13 may serve as electrode terminals connected to the positive electrode and negative electrode of battery 10.

In the present exemplary embodiment, the end of flexible section 5a on the opening end surface 2 side is located closer to third side-surface section 3 than projection 4a in the extending direction as shown in FIG. 1A. Slit 11 is located at second side-surface section 5 side when upper surface section 6 or lower surface section 7 is divided by center line J. Here, center line J passes the center of battery 10 and is parallel with first and second side-surface sections 4 and 5. In the present exemplary embodiment, slit 11 extends toward opening end surface 2 in parallel with first and second side-surface sections 4 and 5.

FIG. 2 is a top view showing an operation of storing battery 10 into storage chamber 1 in accordance with the present exemplary embodiment. In FIG. 2, elastic pieces 12 and 13 are omitted.

As shown in FIG. 2, battery 10 is inserted into storage chamber 1 from the opening end surface 2 side. After the side surface of battery 10 abuts on the inside of projection 4a and flexible section 5a, flexible section 5a is expanded to the outside of storage chamber 1 by pushed battery 10, and battery 10 is stored into storage chamber 1. After battery 10 is stored, flexible section 5a is returned to the original position.

Figure 3A:
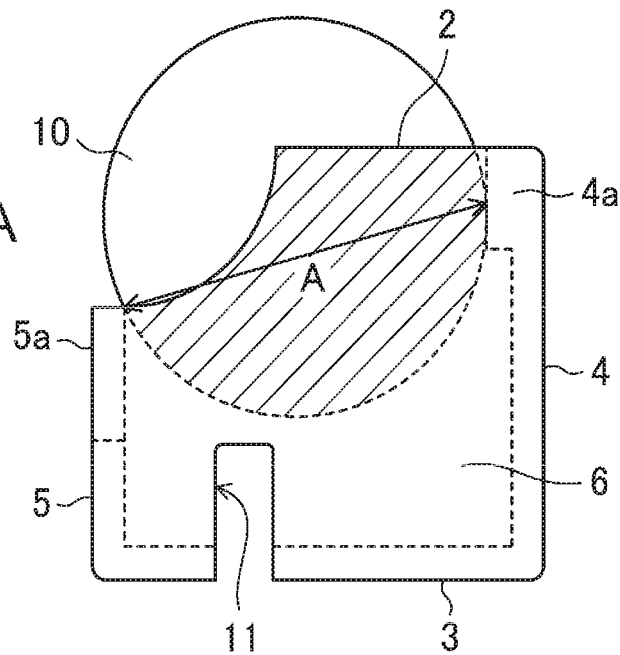
FIG. 3A and FIG. 3B are top views schematically showing the difference between the forces required for inserting the battery into the storage chambers to store the battery.
Figure 3B:
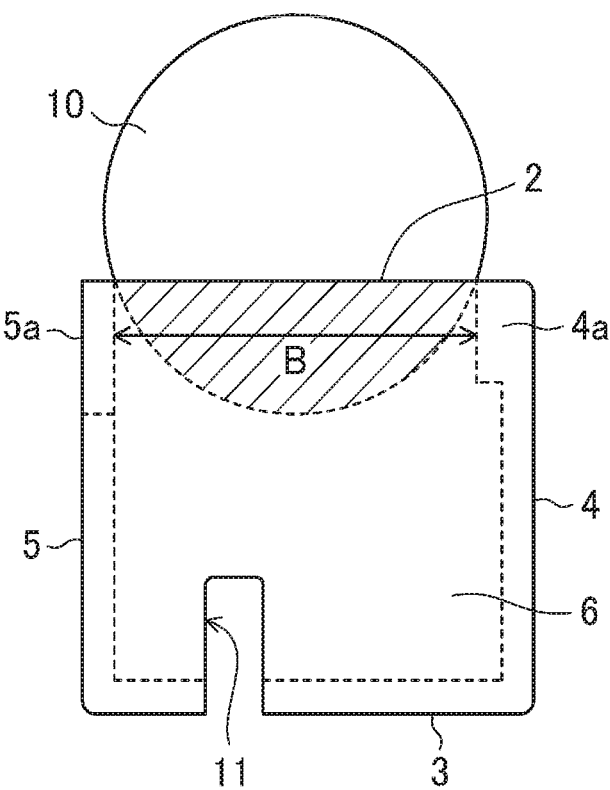

As shown in FIG. 3A, the end of flexible section 5a on the opening end surface 2 side is located closer to third side-surface section 3 than projection 4a in the extending direction. Therefore, opening width A through which battery 10 is inserted, is wider than opening width B obtained in the case where flexible section 5a is disposed at the same level as projection 4a as shown in FIG. 3B. Therefore, as shown in FIG. 2, by inserting battery 10 in an oblique direction shown by arrow P, battery 10 can be stored into storage chamber 1 with a weak force.

As shown in FIG. 3A, battery 10 is inserted temporarily until the side surface of battery 10 abuts on projection 4a and flexible section 5a. At this time, the area (shaded area in FIG. 3A) of battery 10 held by upper surface section 6 and lower surface section 7 of storage chamber 1 is larger than the area (shaded area in FIG. 3B) obtained when flexible section 5a is disposed at the same level as projection 4a as shown in FIG. 3B. Therefore, battery 10 can be smoothly moved into storage chamber 1. Thus, battery 10 can be stored into storage chamber 1 without an excessive force.

Figure 4:
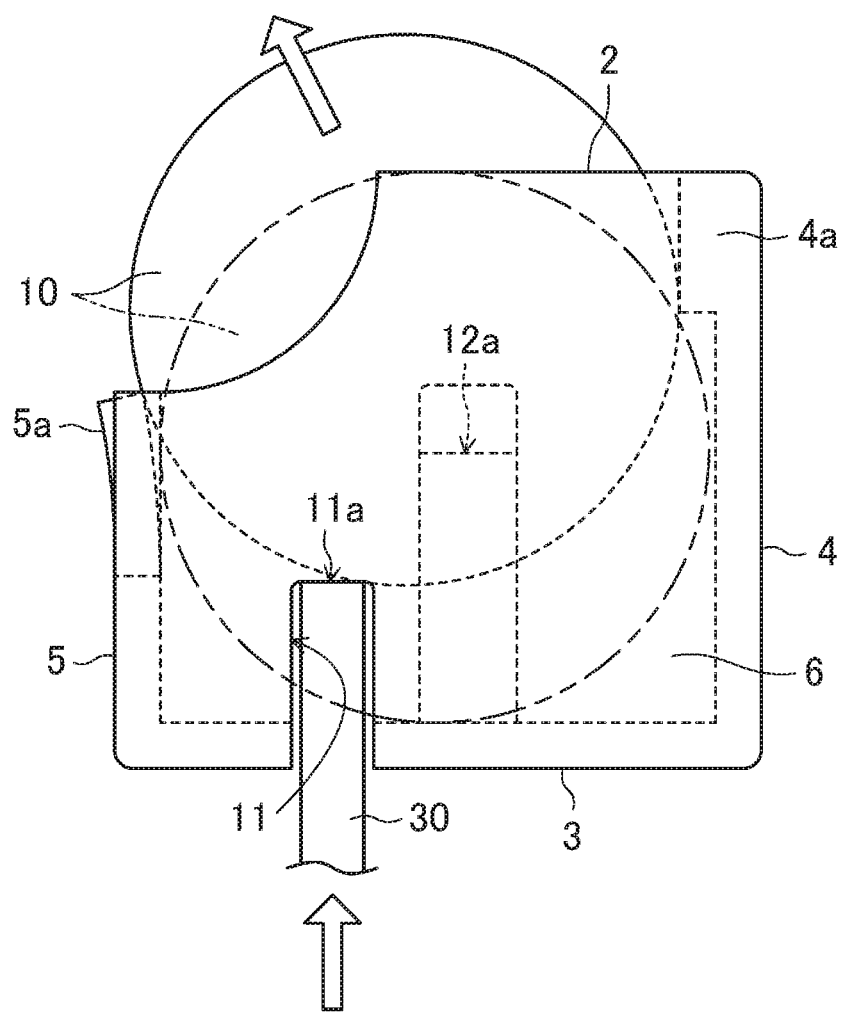
FIG. 4 is a top view showing an operation of taking the battery out of the storage chamber in accordance with the exemplary embodiment of the present invention.

FIG. 4 is a top view showing an operation of taking battery 10 out of storage chamber 1 in accordance with the present exemplary embodiment. In FIG. 4, elastic piece 13 is omitted.

As shown in FIG. 4, plate-like jig 30 is inserted into slit 11 that extends from third side-surface section 3 toward opening end surface 2, and jig 30 is moved in the arrow direction, namely toward opening end surface 2. Thus, battery 10 can be pushed out of opening end surface 2.

At this time, by moving jig 30 along the inner surface of slit 11, slit 11 serves as a guide and jig 30 can be smoothly moved in the arrow direction. Thus, a part of battery 10 can be certainly pushed out of opening end surface 2 without an excessive force.

The width of slit 11 is not particularly limited. However, preferably, the width is narrower than the diameter (5.6 mm) of test fingers that simulate fingers of children ages one to three defined by International Electrotechnical Commission (IEC) 61032. Thus, an accident in which a little child accidentally operates the battery holder, takes out battery 10, and accidentally ingests it can be prevented.

Pushed-out battery 10, namely battery 10 partially exposed from opening end surface 2 to the outside, can be easily pulled out of storage chamber 1 while being grasped with fingers, for example. The exposure of battery 10 from opening end surface 2 can be easily set by adjusting the position of the end of slit 11 on the opening end surface 2 side.

When a part of battery 10 is pushed out of opening end surface 2 using jig 30 and is exposed to the outside, by keeping battery 10 in a state where battery 10 is pressed by elastic piece 12, the possibility that battery 10 comes out of storage chamber 1 and becomes lost is eliminated. Specifically, as shown in FIG. 4, pressing portion 12a at which elastic piece 12 presses battery 10, is set closer to opening end surface 2 than end 11a of slit 11 on the opening end surface 2 side is. Thus, even when jig 30 is moved to end 11a of slit 11 on the opening end surface 2 side, pressing portion 12a of elastic piece 12 is located on the upper surface of battery 10. Therefore, elastic piece 12 is kept to press battery 10 that is partially pushed and located out of opening end surface 2. Therefore, even when a part of battery 10 is pushed out of opening end surface 2 using jig 30, there is no possibility that battery 10 comes out of storage chamber 1.

Figure 5A:
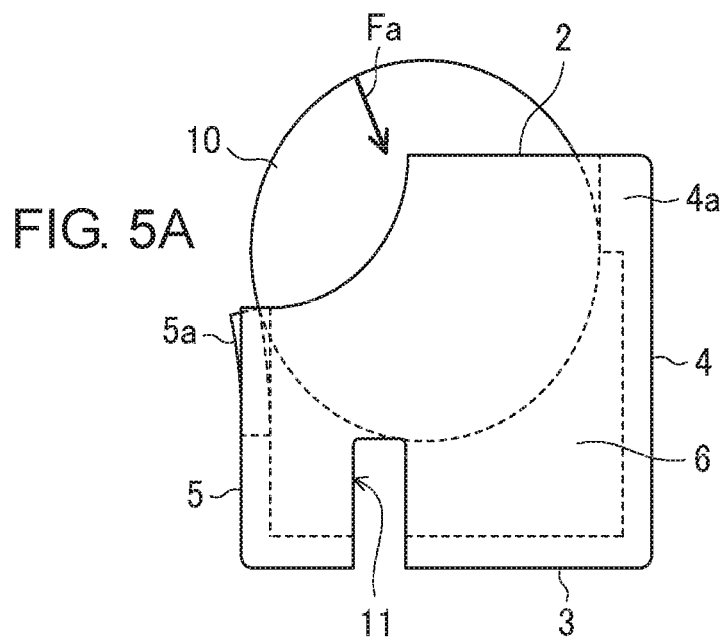
FIGS. 5A and 5B show diagrams schematically showing the force applied to the battery in accordance with the exemplary embodiment of the present invention.
Figure 5B:
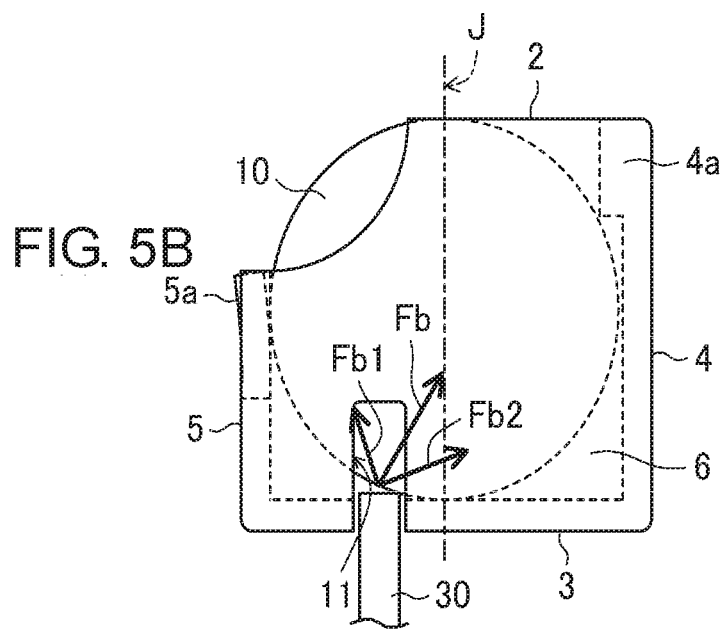

FIG. 5A and FIG. 5B are top views showing the forces applied to battery 10 when battery 10 is stored in storage chamber 1 and when battery 10 is taken out of storage chamber 1. In FIG. 5A and FIG. 5B, elastic pieces 12 and 13 are omitted.

When battery 10 is stored into storage chamber 1, battery 10 can be stored with the weakest force by inserting battery 10 in the direction in which the opening width for insertion of battery 10 is the widest as shown in FIG. 3A. Here, the direction is the oblique direction shown by arrow P of FIG. 2. In other words, as shown in FIG. 5A, battery 10 can be stored into storage chamber 1 with the weakest force by pushing battery 10 with force Fa having the direction shown by the arrow.

When battery 10 is taken out of storage chamber 1, as shown in FIG. 5B, force Fb applied to battery 10 when jig 30 is inserted into slit 11 to push out battery 10 works toward projection 4a. That is because slit 11 is located at second side-surface section 5 side from center line J passing the center of battery 10 is. Since battery 10 is restricted by projection 4a, in order to take out battery 10, force component Fb1 having the direction opposite to that of the force (namely, force Fa used for storing battery 10) of expanding flexible section 5a outward, must be used. Therefore, in order to expand flexible section 5a outward with force Fb1 having the same magnitude as that of force Fa, force Fb used for pushing out battery 10 must have a magnitude greater than that of force Fa used for storing battery 10.

In the present exemplary embodiment, thus, battery 10 can be stored in storage chamber 1 with weak force Fa, but battery 10 cannot be taken out without force Fb stronger than force Fa for storage. Thus, battery 10 stored in storage chamber 1 can be prevented from being accidentally taken out. When battery 10 is taken out, by using jig 30, battery 10 can be smoothly taken out along slit 11 as a guide. Furthermore, battery 10 stored in storage chamber 1 is restricted by projection 4a, so that, even if the battery holder drops, battery 10 can be prevented from dropping off on the impact.

Figure 6:
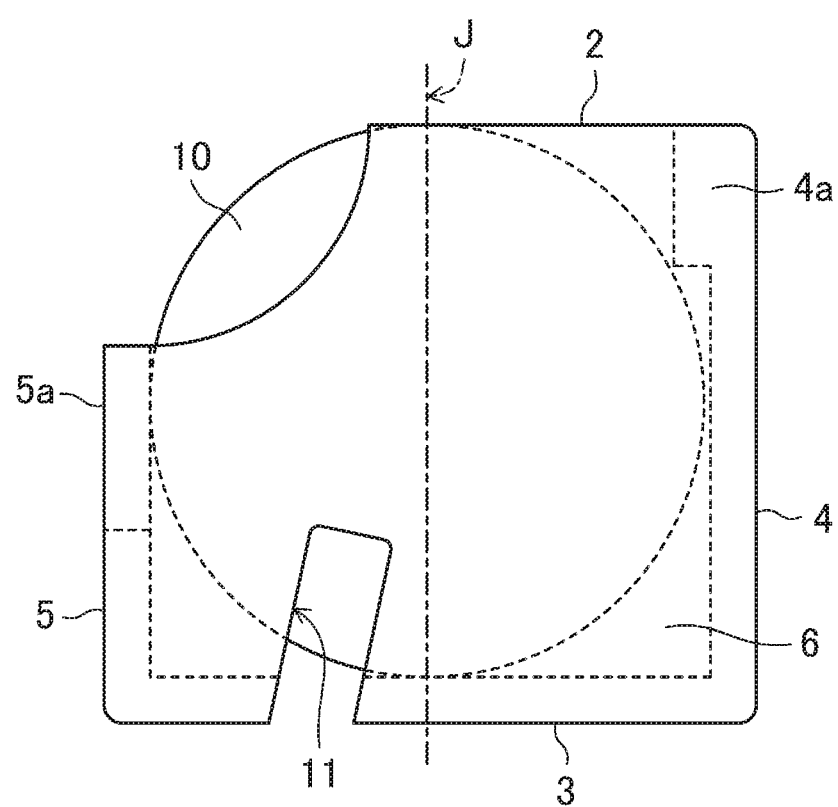
FIG. 6 is a top view schematically showing the configuration of a battery holder in accordance with a modified example of the present exemplary embodiment.

In the present exemplary embodiment, slit 11 has a shape where it extends toward opening end surface 2 in parallel with first and second side-surface sections 4 and 5. However, as shown in FIG. 6, slit 11 may have a shape where it extends from third side-surface section 3 toward opening end surface 2 so that it is tilted from second side-surface section 5 to first side-surface section 4.

FIG. 7 shows diagrams schematically showing the configuration of a battery holder in accordance with a modified example of the present exemplary embodiment. FIG. 7A is a top view, FIG. 7B is a side view from the third side-surface section 3 side, and FIG. 7C is a bottom view.

In the modified example, the form of slit 11 is different from the exemplary embodiment shown in FIG. 1A to FIG. 1D.

In the modified example, as shown in FIG. 7A to FIG. 7C, slit 11 that extends from third side-surface section 3 toward opening end surface 2 and stops at the position corresponding to a part of battery 10 is formed in lower surface section 7 of storage chamber 1. In other words, as shown in FIG. 7C, when storage chamber 1 is viewed from the lower surface section 7 side in the state where battery 10 is stored in storage chamber 1, a part of the lower surface of battery 10 is exposed from slit 11. As shown in FIG. 7B, in order to simultaneously take out two batteries 10, at least a part of the side surfaces of both batteries 10 must be exposed from slit 11 when storage chamber 1 is viewed from the third side-surface section 3 side.

In the modified example, as shown in FIG. 7(a) to FIG. 7(c), slit 11 that extends from third side-surface section 3 toward opening end surface 2 and stops at the position corresponding to a part of battery 10 is formed in lower surface section 7 of storage chamber 1. In other words, as shown in FIG. 7(c), when storage chamber 1 is viewed from the lower surface section 7 side in the state where battery 10 is stored in storage chamber 1, a part of the lower surface of battery 10 is exposed from slit 11. As shown in FIG. 7(b), in order to simultaneously take out two batteries 10, at least a part of the side surfaces of both batteries 10 must be exposed from slit 11 when storage chamber 1 is viewed from the third side-surface section 3 side.

In the modified example, for example, even when upper surface section 6 of storage chamber 1 does not have a space for forming slit 11 at a position other than that of elastic piece 12, slit 11 can be formed in lower surface section 7. The storing and taking-out of battery 10 in the modified example can be performed with operations similar to those shown in FIG. 2 and FIG. 4.

Next, an application example is described in which the battery holder of the present invention is mounted on an electronic apparatus that uses a button battery as its power source.

Figure 8:
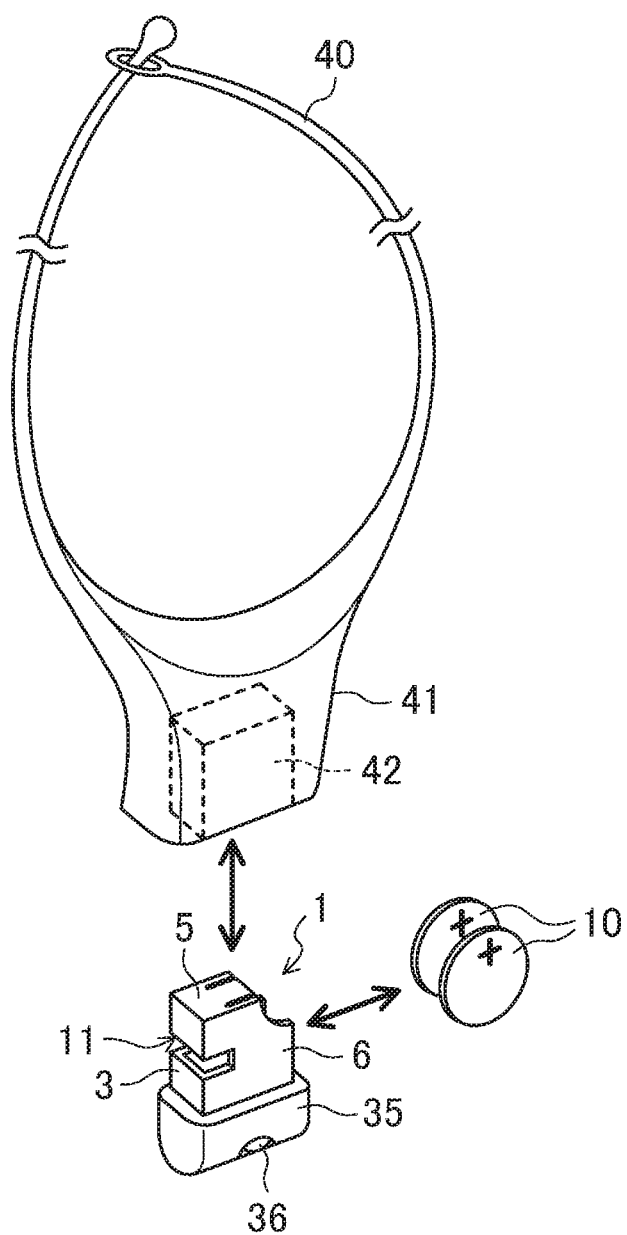
FIG. 8 is a perspective view showing the configuration of a portable lighting apparatus formed by integrating a lighting unit with the battery holder of the present invention.

FIG. 8 is a perspective view showing the configuration of a portable lighting apparatus formed by integrating a lighting unit that uses battery 10 as its power source with the battery holder of the present invention.

As shown in FIG. 8, storage chamber 1 of the battery holder is formed integrally with lighting unit 35 incorporated with light source 36 for illumination. Lighting unit 35 includes a conductive plate (not shown) that is electrically connected to electrode terminals (elastic pieces) 12 and 13 connected to the positive electrode and negative electrode of battery 10 stored in storage chamber 1. Thus, power is supplied to light source 36 incorporated in lighting unit 35. Lighting unit 35 includes a switch (not shown) for turning on or off power supply to light source 36. While, storage chamber 1 of the battery holder, in the storing state of battery 10, is detachably mounted in recess 42 in holding unit 41 disposed at an end of neck strap 40.

Thus, the present invention has been described using an appropriate exemplary embodiment. However, such description is not a limited item, but can be variously modified. For example, the above-mentioned exemplary embodiment has described the example in which two batteries are stacked and stored in storage chamber 1. However, the number of batteries 10 stored in storage chamber 1 is not particularly limited, and may be one. As an example of projection 4a, the configuration where the thickness of first side-surface section 4 is great has been described. However, projection 4a is not limited to this. A member having a predetermined thickness may be attached to the inner wall of first side-surface section 4. As an example of flexible section 5a, the configuration where a pair of cutouts 20 are formed in second side-surface section 5 has been described. However, flexible section 5a is not limited to this. Any flexible section 5a may be employed as long as it elastically deforms to the outside or inside of storage chamber 1. Flexible section 5a may be made of a material different from that of second side-surface section 5. "Battery holder" of the present invention includes a battery holder that is integrated with not only storage chamber 1 for storing battery 10 but also another component such as an electronic apparatus.

INDUSTRIAL APPLICABILITY

The present invention is useful for a battery holder for storing a button battery used as a power source of an electronic apparatus.

The invention claimed is:
1. A battery holder comprising:
a storage chamber for storing a button battery,
wherein the storage chamber including:
an opening end surface through which the button battery is taken in or out while being led by a side surface of the button battery; and
an upper surface section, a lower surface section, a first side-surface section, and a second side-surface section for holding flat surfaces and a side surface of the button battery, the first side-surface section and the second side-surface section opposing each other,
wherein a projection projecting toward an inside of the storage chamber is formed on an inner wall of the first side-surface section at a portion including an end on an opening end surface side,
a flexible section deformable toward an outside of the storage chamber is formed on the second side-surface section at a portion including an end on the opening end surface side,
a slit is formed in at least one of the upper surface section and the lower surface section, the slit extending from a third side-surface section opposite to the opening end surface toward the opening end surface, and extending to a position corresponding to a part of the button battery,
an end of the flexible section on the opening end surface side is located closer to the third side-surface section than the projection in an extending direction of the flexible section, and
the slit is located at the second side-surface section from a center line passing a center of the button battery and being parallel with the first side-surface section and the second side-surface section.

2. The battery holder according to claim 1, wherein the flexible section is configured so that a pair of cutouts extending from the end on the opening end surface side toward the third side-surface section are formed in the second side-surface section.

3. The battery holder according to claim 1, wherein the storage chamber further includes an elastic piece for pressing at least one of the flat surface and the side surface of the button battery.

4. The battery holder according to claim 1, wherein a width of the slit is narrower than a diameter (5.6 mm) of a test finger defined by International Electrotechnical Commission (IEC).

5. A portable lighting apparatus integrally comprising:
the battery holder according to claim 1; and
a lighting unit coupled to the storage chamber of the battery holder and using the button battery as a power source,
wherein the storage chamber is detachably mounted on a holding unit disposed at an end of a neck strap.

* * * * *